(12) United States Patent
Ohtomo et al.

(10) Patent No.: US 7,821,737 B2
(45) Date of Patent: Oct. 26, 2010

(54) THIN FILM MAGNETIC HEAD FOR HIGH DENSITY RECORDING AND HAVING A LEADING SIDE MAGNETIC POLE PIECE OF VARIABLE WIDTH AT THE MEDIA FACING SURFACE

(75) Inventors: Shigekazu Ohtomo, Saitama (JP); Hiroshi Fukui, Ibaraki-ken (JP); Toshimi Yokoyama, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 565 days.

(21) Appl. No.: 11/486,802

(22) Filed: Jul. 14, 2006

(65) Prior Publication Data

US 2007/0019326 A1 Jan. 25, 2007

(30) Foreign Application Priority Data

Jul. 20, 2005 (JP) .............................. 2005-209612

(51) Int. Cl.
*G11B 5/187* (2006.01)
(52) U.S. Cl. .............................. 360/125.46; 360/125.51
(58) Field of Classification Search ................ 360/126, 360/77.05, 77.08, 125.43, 125.44, 125.46, 360/125.51; 29/603.12, 603.16
See application file for complete search history.

(56) References Cited

U.S. PATENT DOCUMENTS 6,618,223 B1 * 9/2003 Chen et al. ............. 360/125.43
6,683,749 B2 * 1/2004 Daby et al. ............. 360/125.51
6,944,938 B1 * 9/2005 Crue et al. ................ 29/603.12
6,947,255 B2 * 9/2005 Hsiao et al. ............. 360/125.51
7,060,207 B2 * 6/2006 Sasaki et al. ............ 360/125.51
7,215,512 B2 * 5/2007 Yazawa et al. ......... 360/125.46
7,296,337 B2 * 11/2007 McFadyen ................ 29/603.16
7,453,663 B1 * 11/2008 Benakli et al. ........... 360/77.08
2003/0053251 A1 * 3/2003 Yoshida et al. .............. 360/126
2003/0112554 A1 * 6/2003 Daby et al. .................. 360/125
2004/0105189 A1 * 6/2004 Ohtomo et al. ............. 360/126
2004/0160696 A1 * 8/2004 Meyer ...................... 360/77.05
2004/0240110 A1 * 12/2004 Matono ....................... 360/126
2005/0135007 A1 * 6/2005 Nishikawa et al. .......... 360/126

FOREIGN PATENT DOCUMENTS

JP 11-273026 10/1999
JP 11-306513 11/1999
JP 11306513 A * 11/1999
JP 2003036506 A * 2/2003

* cited by examiner

*Primary Examiner*—Jefferson Evans
(74) *Attorney, Agent, or Firm*—Patterson & Sheridan, LLP

(57) ABSTRACT

Embodiments of the invention provide a thin film magnetic head suitable for high density recording having a small erase band ΔE and a small fringe magnetic field, and a large recording magnetic field. In one embodiment, a width LW of a lower magnetic pole piece protuberance of a leading side magnetic pole piece, at a face in contact with a write gap layer, is made smaller than a width TW of an upper magnetic pole piece front layer of a trailing side magnetic pole piece, at a face in contact with the write gap layer, and the width of the lower magnetic pole piece protuberance adjacent to the write gap layer is made larger, in a direction from the write gap layer.

18 Claims, 12 Drawing Sheets

THIN FILM MAGNETIC HEAD FOR HIGH DENSITY RECORDING AND HAVING A LEADING SIDE MAGNETIC POLE PIECE OF VARIABLE WIDTH AT THE MEDIA FACING SURFACE

CROSS-REFERENCES TO RELATED APPLICATIONS

This application claims priority from Japanese Patent Application No. JP2005-209612, filed Jul. 20, 2005, the entire disclosure of which is incorporated herein by reference.

BACKGROUND OF THE INVENTION

The present invention relates to a thin film magnetic head which can be used in a magnetic disk drive, and more particularly, relates to a thin film magnetic head having a narrow track width suitable for high density recording.

In recent years, with an improvement of recording density of the magnetic disk drive, it has been keenly required to develop a thin film magnetic head which has excellent read/write characteristics, and to improve performance of a recording medium. At present, a head employing a GMR (Giant Magnetoresistive Effect) element capable of obtaining high read outputs is used as a read head. Moreover, a TMR (Tunneling Magnetoresistive) element and a CPP (Current Perpendicular to Planer) element capable of obtaining much higher read-back sensitivity have also been developed. On the other hand, the conventional inductive thin film recording head making use of electromagnetic induction has been used as a recording head, and a thin film magnetic head having the above described read head and recording head integrally formed has been used.

In order to realize the high density recording, it is necessary to enhance track density as well as linear recording density. In the conventional thin film magnetic head, an effective recording track width in which magnetization of signals is recorded is smaller than an erase width for erasing recorded signals, and there exists an erase band ΔE having a certain width (=erase width−effective recording track width)/2. In the conventional thin film magnetic head, it was difficult to reduce the erase band ΔE. There was such a problem that in the case where the erase width is narrowed by reducing a geometric track width of the recording head, the effective recording track width is also decreased, which may cause deterioration of S/N ratio and overwrite characteristic (O/W).

Further, as the track density is improved and a track pitch is narrowed, a magnetic field generated from the recording head is extended to an adjacent track. As a result, there may be such a problem that a so-called ATI (Adjacent Track Interference) may occur. Measures for solving this problem have been also sought.

Patent Document 1 (Japanese Patent Laid-Open No. Hei 11-306513) discloses a composite type magnetic head, having a structure suitable for high density recording. In this composite type magnetic head, sizes of an upper magnetic pole piece and a lower magnetic pole piece which constitute a write gap are made shorter at a leading side and longer at a trailing side, in a direction of a track width at a side of the write gap, as seen from a face opposed to a medium, and the saturation magnetic flux density of materials for the upper magnetic pole piece is made larger than the saturation magnetic flux density of the lower magnetic pole piece, to thereby decrease a bend and an erase width at a track end of magnetization transition, and to narrow the recording track width.

Patent Document 2 (Japanese Patent Laid-Open No. 2003-36506) discloses a thin film magnetic head in which a front end portion of the lower magnetic pole piece is provided on a main layer of the lower magnetic pole piece, and the front end portion of the lower magnetic pole piece is provided with a protruding step having a larger width than a width of a front end layer of the upper magnetic pole piece, to thereby decrease an unnecessary magnetic field at an off track position.

BRIEF SUMMARY OF THE INVENTION

In the case where the track width and the track pitch are decreased for the purpose of complying with the tendency of the high density magnetic recording in recent years, it has become more and more difficult, employing only the above described prior art, to reduce the erase band ΔE, and to decrease a fringe magnetic field so as not to reduce signals in the adjacent track, while generating such a recording magnetic field that recording can be sufficiently made on a medium having a high coercivity.

A feature of the invention is to provide a thin film magnetic head which generates a sufficient recording magnetic field, and has a small erase band ΔE and a decreased fringe magnetic field.

In accordance with an aspect of the present invention, a thin film magnetic head comprises: a read part including a magnetic shield layer and a read element formed above a substrate; and a write part including a leading side magnetic pole piece and a trailing side magnetic pole piece being opposed to each other through a write gap; wherein a width of the leading side magnetic pole piece at a face in contact with the write gap is smaller than a width of the trailing side magnetic pole piece at a face in contact with the write gap, and a width of the leading side magnetic pole piece in an area apart from the write gap is made larger, in a direction away from the write gap.

According to the invention, it is possible to provide a thin film magnetic head which generates a sufficient recording magnetic field, and has a small erase band ΔE and a decreased fringe magnetic field.

DETAILED DESCRIPTION OF THE INVENTION

Figure 3:
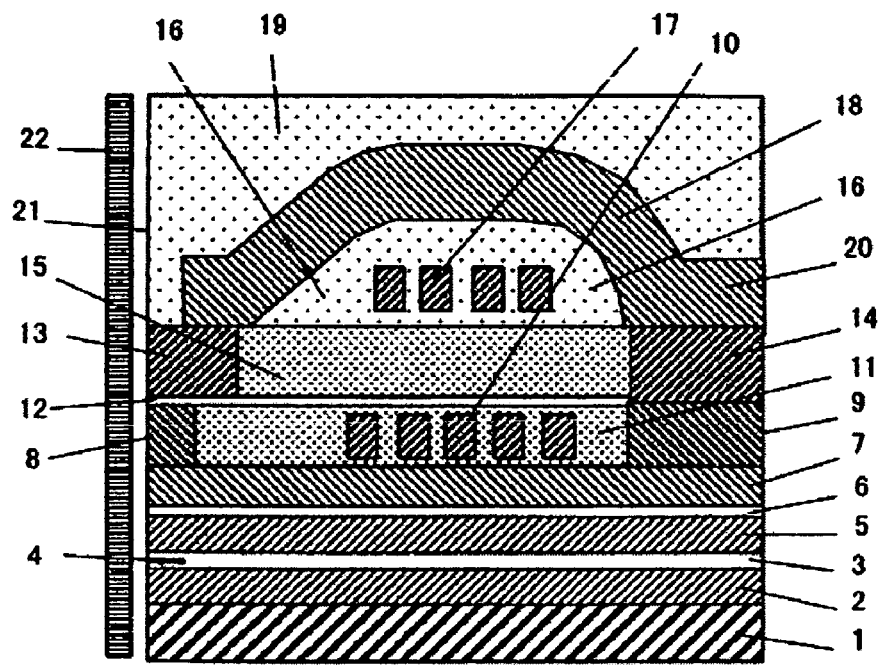
FIG. 3 is a sectional view of the thin film magnetic head to which the invention is applied.
Figure 4:
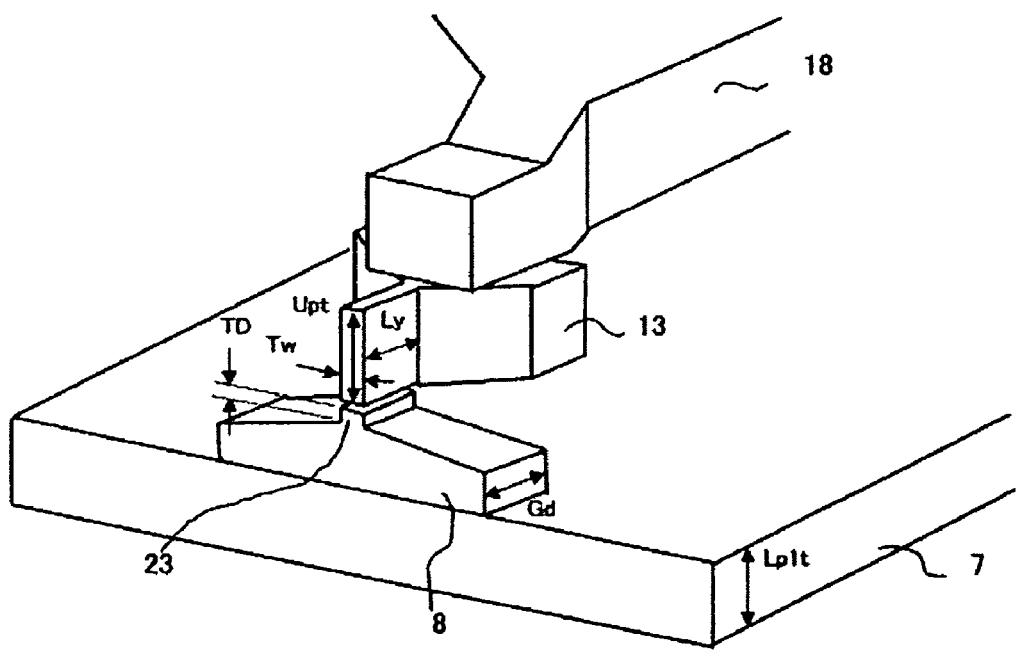
FIG. 4 is a perspective view showing a front end part of the recording head included in the thin film magnetic head as shown in FIG. 3.

Now, the invention will be described in detail referring to embodiments. An example of a structure of a thin film magnetic head to which the invention is applied is shown in FIGS. 3 and 4. FIG. 3 is a sectional view, and FIG. 4 is a perspective view, showing a part surrounding a front end of a recording head. A lower magnetic shield layer 2 is provided on a substrate 1 formed of nonmagnetic material. The lower magnetic shield layer 2 is formed of soft magnetic material for enhancing reproducing and resolving performance and for excluding influence from an outside magnetic field. Moreover, a read gap 3 formed of nonmagnetic insulating material is provided on the lower magnetic shield layer 2, and a read element 4 formed of a GMR element, TMR element or CPP element is arranged in the read gap 3. An upper magnetic shield layer 5 is provided on the read gap 3, and further, a separation layer 6 formed of nonmagnetic material for separating the recording head from the read head is provided.

A lower magnetic pole piece main layer 7, a lower magnetic pole piece front end layer 8, and a lower magnetic pole piece rear end layer 9 are successively provided on the separation layer 6. A lower layer coil 10 is provided between the lower magnetic pole piece front end layer 8 and the lower magnetic pole piece rear end layer 9, and a lower nonmagnetic insulating layer 11 is filled between them. A write gap layer 12 is formed on the lower magnetic pole piece front end layer 8 and the lower nonmagnetic insulating layer 11, and further, an upper magnetic pole piece front end layer 13, an upper magnetic pole piece rear end layer 14, and an upper nonmagnetic insulating layer 15 are provided on the write gap layer 12. A coil insulating layer 16 and an upper layer coil 17 are arranged on the upper nonmagnetic insulating layer 15. Still further, an upper magnetic pole piece upper layer 18 is provided on coil insulating layer 16, and an entire head is covered with a protective layer 19.

A front end of the upper magnetic pole piece upper layer 18 is retreated from an air bearing surface 21, when arranged. A rear end part 20 of the upper magnetic pole piece upper layer 18 and the upper magnetic pole piece rear end layer 14 are magnetically connected to the lower magnetic pole piece rear end layer 9. The lower layer coil 10 and the upper layer coil 17 are so constructed as to surround the lower magnetic pole piece rear end layer 9 and the rear end part 20 of the upper magnetic pole piece upper layer 18, respectively. When recording current is supplied to the lower layer coil 10 and the upper layer coil 17, magnetic flux is induced in the upper magnetic pole piece front end layer 13, the upper magnetic pole piece upper layer 18, the upper magnetic pole piece rear end layer 14, the lower magnetic pole piece rear end layer 9, the lower magnetic pole piece main layer 7, and the lower magnetic pole piece front end layer 8. In this way, the recording magnetic field generated from the front end of the write gap layer 12 allows a signal to be recorded on a recording medium (magnetic disk) 22 which moves at a minute distance from the air bearing surface 21. In these thin film magnetic heads, generally, the lower magnetic pole piece is used as a leading side magnetic pole piece, and the upper magnetic pole piece is used as a trailing side magnetic pole piece to conduct recording action.

FIG. 4 shows only a part of the lower magnetic pole piece main layer 7, the lower magnetic pole piece front end layer 8, the upper magnetic pole piece front end layer 13, and the upper magnetic pole piece upper layer 18. The lower magnetic pole piece front end layer 8 has a lower magnetic pole piece protuberance 23 having a same width as a track width Tw of the upper magnetic pole piece front end layer 13, at a side opposed to a gap face. When the lower magnetic pole piece protuberance 23 as above described is provided, it is possible to decrease generation of an unnecessary fringe magnetic field in a direction of the track width, as compared with a case where the lower magnetic pole piece protuberance is not provided. In this manner, the above described problem of ATI can be reduced.

For the above described thin film magnetic head, a width Tw of the upper magnetic pole piece front end layer 13 as the trailing side magnetic pole piece is 0.18 μm, a gap length GL is 0.1 μm, a height TD of the lower magnetic pole piece protuberance 23 is 0.25 μm, a height Upt of the upper magnetic pole piece front end layer 13 is 1.3 μm, a depth Gd of the lower magnetic pole piece front end layer 8 is 1 μm, and a throttle position Ly of the upper magnetic pole piece front end layer 13 is 1 μm. Moreover, saturation magnetic flux density of magnetic materials for the lower magnetic pole piece front end layer 8, the lower magnetic pole piece protuberance 23, and the upper magnetic pole piece front end layer 13 is 2.4 T. A shape of the head as seen from the air bearing surface 21 is shown in FIG. 5(a). The thin film magnetic head in which a width LW of the leading side magnetic pole piece is smaller than a width TW of the trailing side magnetic pole piece, which is disclosed in Patent Document 1, is shown in FIG. 5(b). Further, for comparison, the thin film magnetic head in which the width LW of the leading side magnetic pole piece is larger than the width TW of the trailing side magnetic pole piece is shown in FIG. 5(c). All these thin film magnetic heads are constructed such that a width UW of the lower magnetic pole piece protuberance 23 is equal to the width LW of the leading side magnetic pole piece at a face in contact with the write gap.

Figure 5:
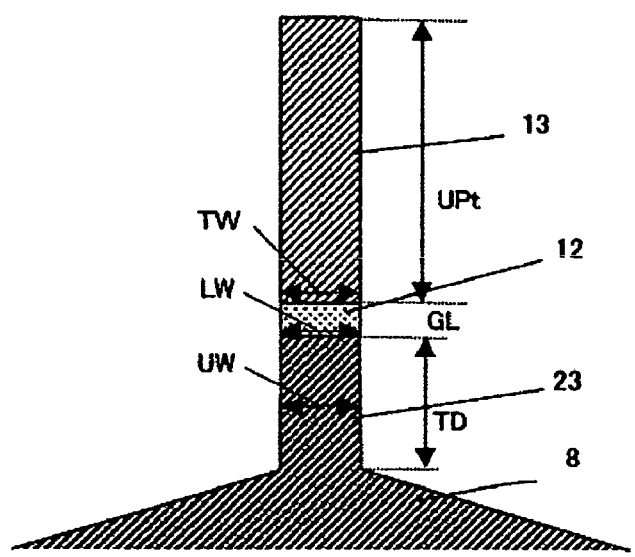
FIG. 5 is front views showing shapes of the recording heads employed for evaluating magnetic characteristics.
Figure 5:
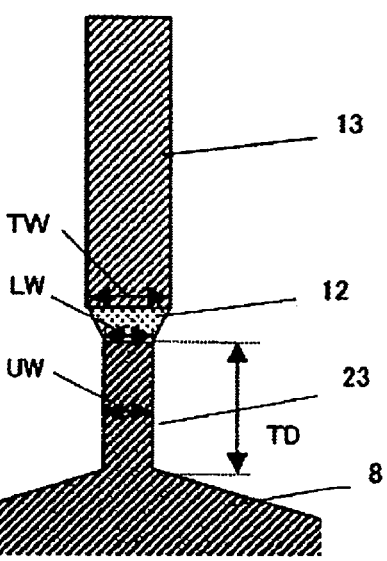
Figure 5:
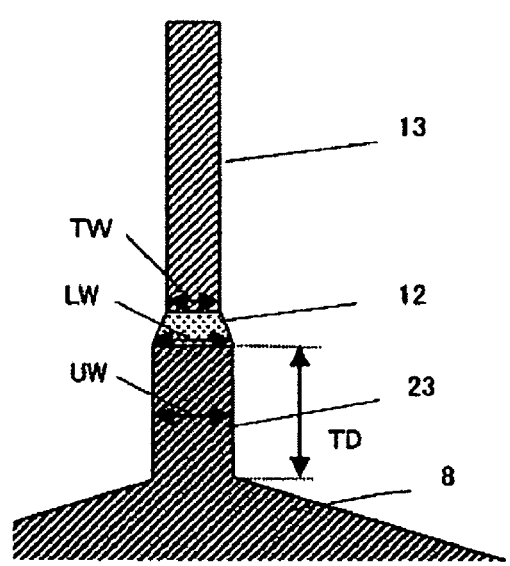
Figure 6:
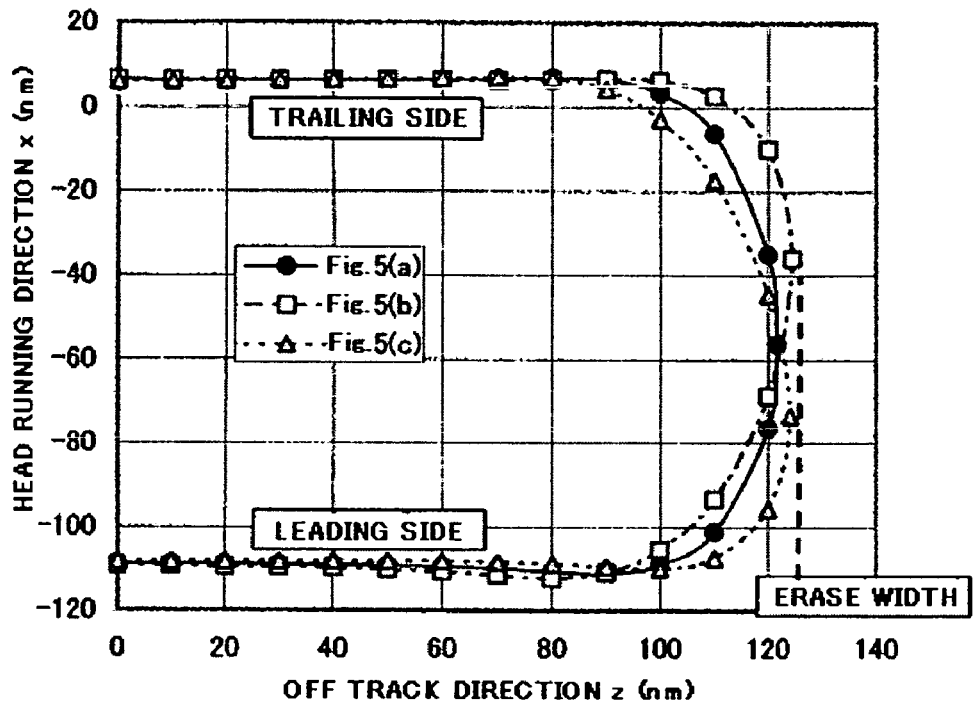
FIG. 6 is a graph showing equi-magnetic field curves in the shapes of FIG. 5.

The erase band ΔE, the magnetic field intensity at a center of the track width, and the fringe magnetic field, when the shape of the recording head was varied as described above, were compared. For the purpose of obtaining the erase width, the effective recording track width, and the erase band ΔE, curves of equal magnetic fields (write bubbles) of a composite magnetic field Hxz ($=\sqrt{Hx^2+Hy^2}$) of a head running direction x and a track width direction z at coercivity Hcr of the medium were obtained. Hcr was set to be 6000 Oe (480 k A/m). A distance from the air bearing surface of the head to a magnetic filed calculating position is set to be 25 nm substantially corresponding to the center of the medium. In the heads as shown in FIGS. 5(*a*), (*b*), and (*c*), the ratios between the width LW of the leading side magnetic pole piece and the width TW of the trailing side magnetic pole piece were set to be 1.0, 0.8, and 1.25 respectively, and the equi-magnetic field curves thus obtained are shown in FIG. 6. The largest width of the write bubble in an off track direction corresponds to the width in which the medium data is erased, and this width was set to be the erase width. The graph shows only a positive side from the track center, and the erase width should include a negative side too.

Figure 7:
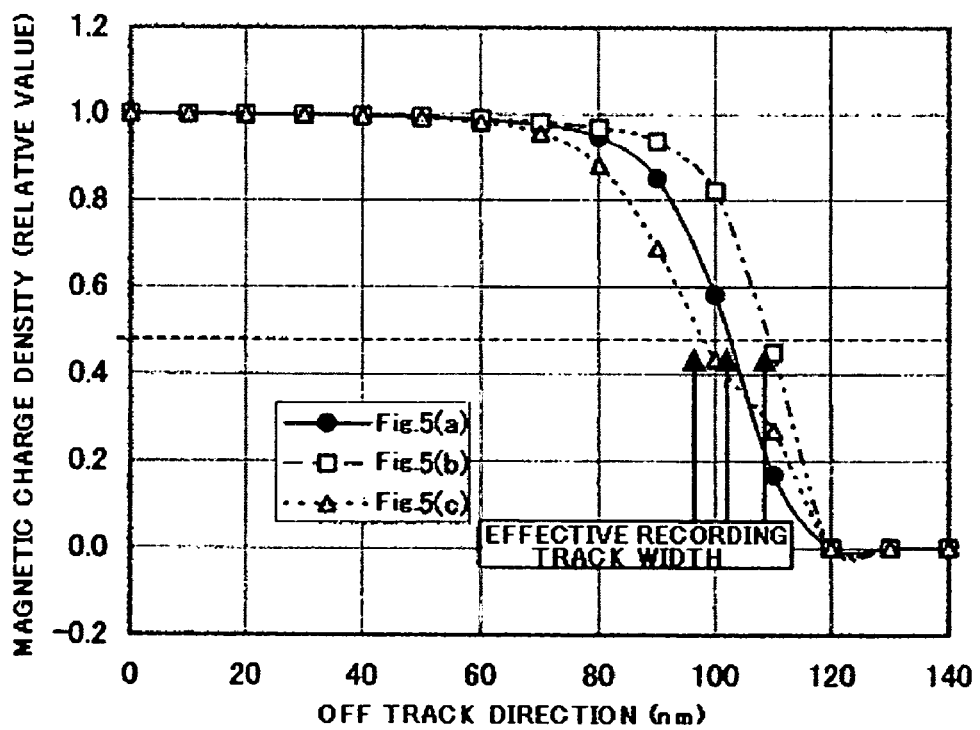
FIG. 7 is a graph showing magnetic charge density in the shapes of FIG. 5.

As shown in FIG. 7, variations of the magnetic charge density, in the off track direction, at the trailing side along the aforesaid write bubble were obtained, and the effective recording track width were obtained from the positions where the magnetic charge density has come to a half of the track center. The graph shows only the positive side from the track center, and the effective recording track width should include the negative side too. The erase band ΔE was defined by a half of a difference between the erase width and the effective recording track width. The recording magnetic field, the fringe magnetic field, the erase width and the effective recording track width at the track center are increased with increasing recording current. The track pitch is mainly determined by the erase width, and in the case where the erase width is large, it would be impossible to decrease the track pitch. In this embodiment, for the purpose of comparing variations in performance according to the shapes of the heads, the erase band ΔE, the recording magnetic field at the track center, and the fringe magnetic field in the adjacent track, under the condition of the recording current at which the erase width is constant (0.24 μm), were compared.

Figure 8:
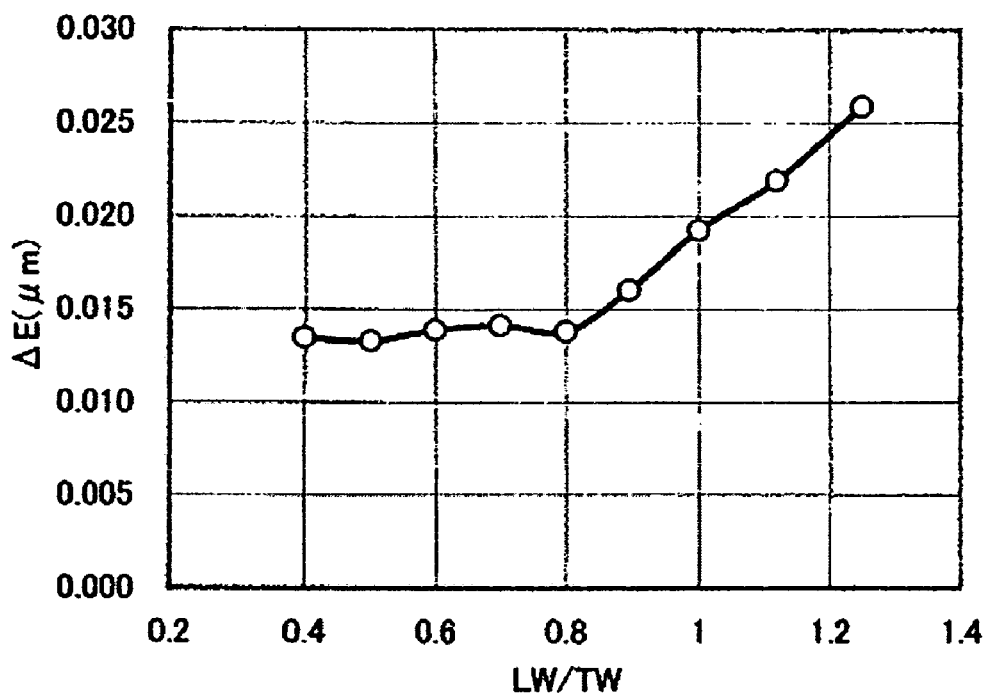
FIG. 8 is a graph showing an erase band ΔE, when a ratio between a width LW of a magnetic pole piece at a leading side and a width TW of a magnetic pole piece at a trailing side is varied.
Figure 9:
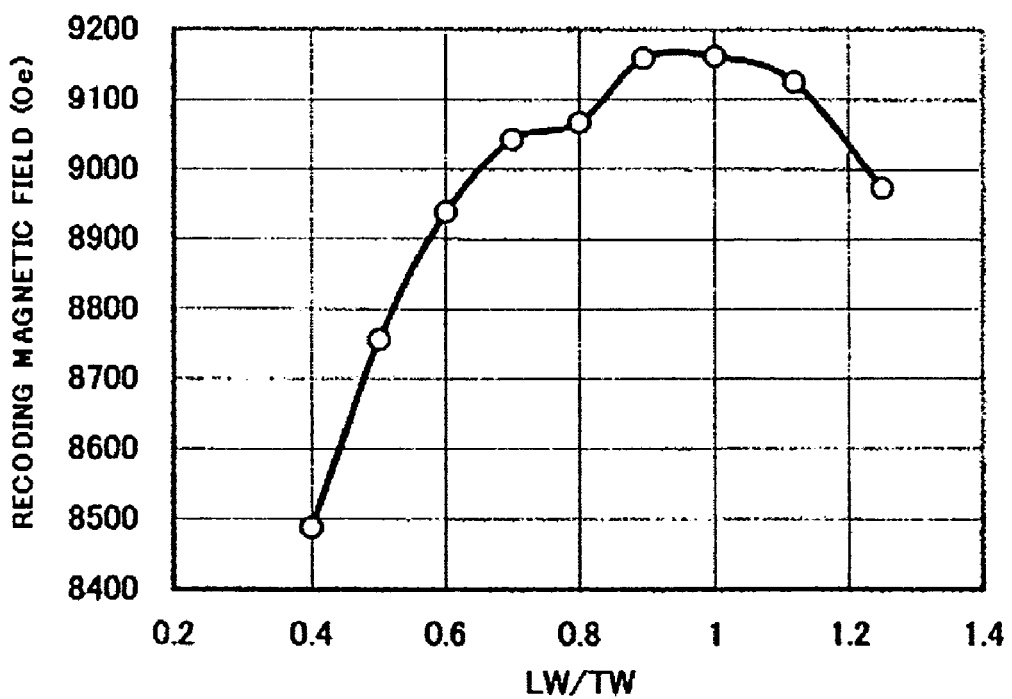
FIG. 9 is a graph showing magnetic field intensity at a track center, when the ratio between the width LW of the magnetic pole piece at the leading side and the width TW of the magnetic pole piece at the trailing side is varied.
Figure 10:
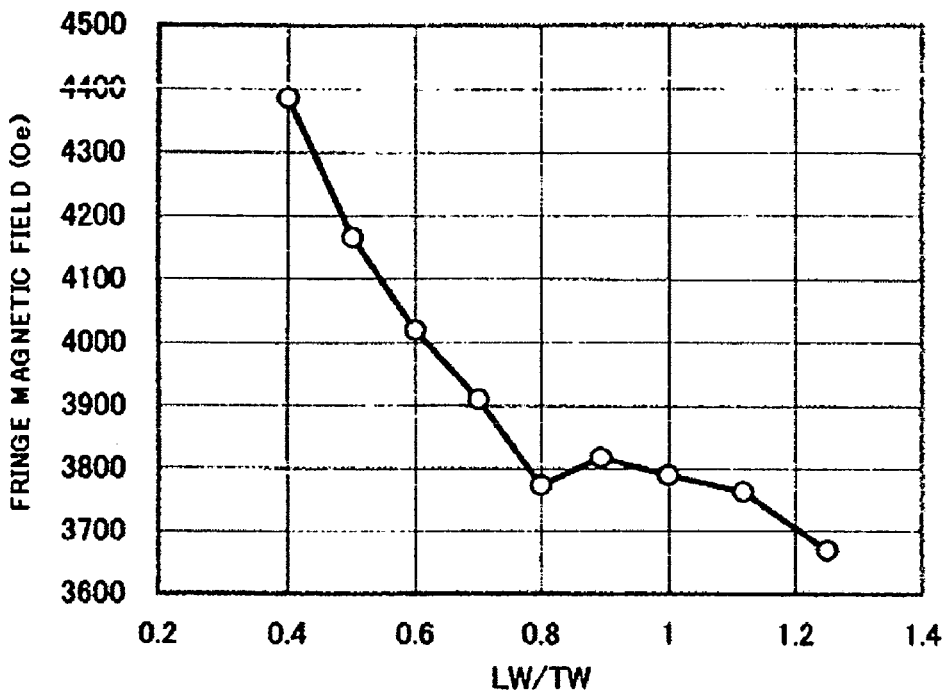
FIG. 10 is a graph showing a fringe magnetic field, when the ratio between the width LW of the magnetic pole piece at the leading side and the width TW of the magnetic pole piece at the trailing side is varied.

FIGS. 8, 9 and 10 respectively show the erase band ΔE, the magnetic field intensity at the center of the track width, and the fringe magnetic field, when the ratio between the width LW of the leading side magnetic pole piece and the width TW of the trailing side magnetic pole piece was varied. As shown in FIG. 8, as the ratio between the width LW of the leading side magnetic pole piece and the width TW of the trailing side magnetic pole piece becomes larger than 1, the erase band ΔE is increased, and as the ratio becomes smaller than 1, the erase band ΔE is decreased. In a region where the ratio LW/TW is smaller than 0.8, the erase band ΔE is substantially constant. The reason why the erase band ΔE is varied depending on the ratio LW/TW, in this manner, can be explained by referring to FIG. 6. Specifically, when the ratio LW/TW is larger than 1, the equi-magnetic field curve is more swelled at the leading side than at the trailing side, as represented by the equi-magnetic field curve of FIG. 5(*c*) in FIG. 6. By contrast, when the ratio LW/TW is smaller than 1, the equi-magnetic field curves is more swelled at the trailing side, as represented by the curve of FIG. 5(*b*) in FIG. 6. The longer a linear portion of the equi-magnetic field curve at the trailing side is, the larger the effective recording track width is, as shown in FIG. 7. Meanwhile, the erase width is determined by the largest width of the equi-magnetic field curve, and so, under the condition that the ratio LW/TW is smaller than 1 (LW/TW<1) where the equi-magnetic field curve at the trailing side is swelled, the erase band ΔE becomes small. On the other hand, as the ratio LW/TW is made smaller, the recording magnetic field at the track center is decreased, as shown in FIG. 9, which leads to deterioration of the overwrite characteristic O/W. Moreover, the fringe magnetic field too at the position of the adjacent track (0.2 μm) is remarkably increased, when the ratio LW/TW is made 0.8 or less, as shown in FIG. 10. This leads to such a problem that the signals in the adjacent track may decrease.

Figure 21:
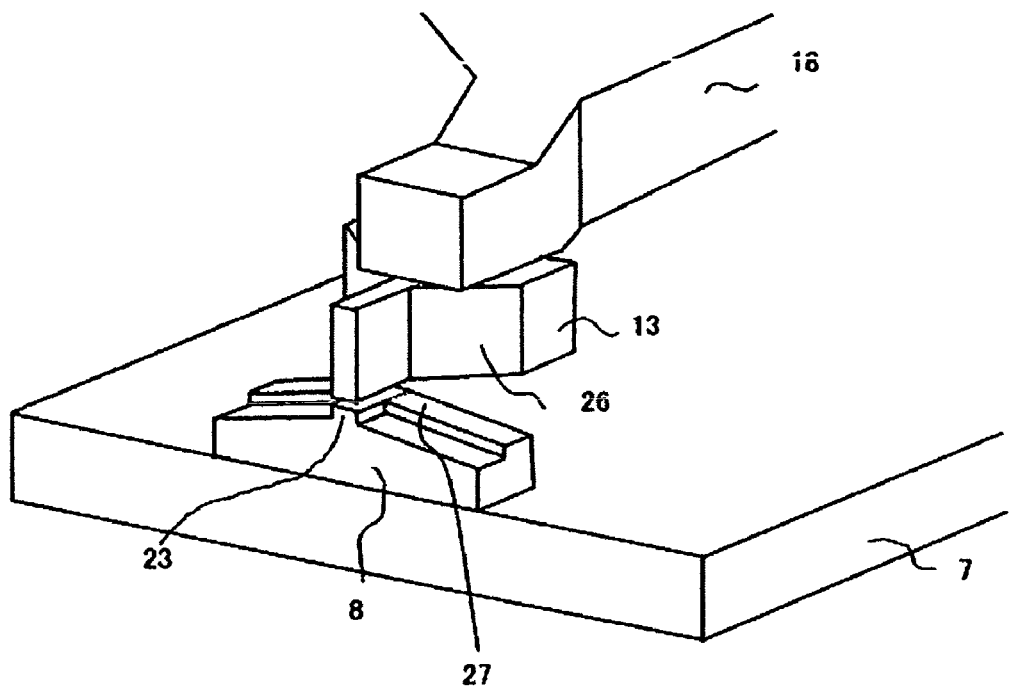
FIG. 21 is a perspective view showing a front end part of the recording head in another structure of the thin film magnetic head to which the invention is applied.
Figure 22:
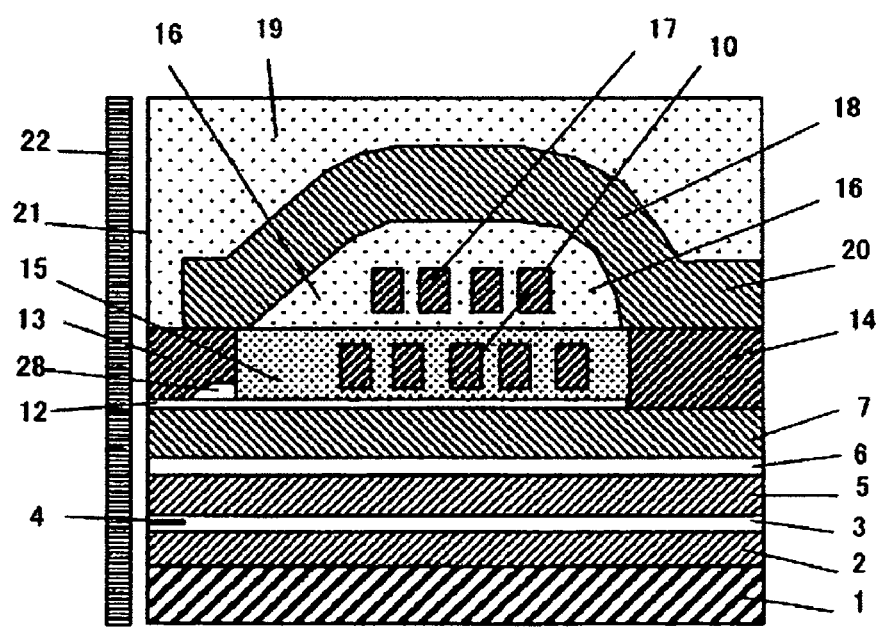
FIG. 22 is a perspective view showing a front end part of the recording head in still another structure of the thin film magnetic head to which the invention is applied.

Although the structure as shown in FIGS. 3 and 4 has been heretofore described as the structure of the thin film magnetic head to which the invention is applied, the thin film magnetic head is not limited to this structure, but the invention may be applied to such structures as shown in FIGS. 21 and 22. FIG. 21 shows the structure in which a step 27 for absorbing the fringe magnetic field is provided on the lower magnetic pole piece front end layer 8, from an end face 26 of the upper magnetic pole piece front end layer 13 at the side of the air bearing surface toward the air bearing surface, that is, behind the lower magnetic pole piece protuberance 23. FIG. 22 shows the structure in which the lower magnetic pole piece front end layer 8 is omitted, and the lower magnetic pole piece is essentially composed of the lower magnetic pole piece main layer (the lower magnetic pole piece layer) 7 and the lower magnetic pole piece protuberance 23. In this structure, the nonmagnetic material 28 for defining the gap depth Gd is provided at the side of the upper magnetic pole piece front end layer 13 or the lower magnetic pole piece main layer 7.

Embodiment 1

Figure 1:
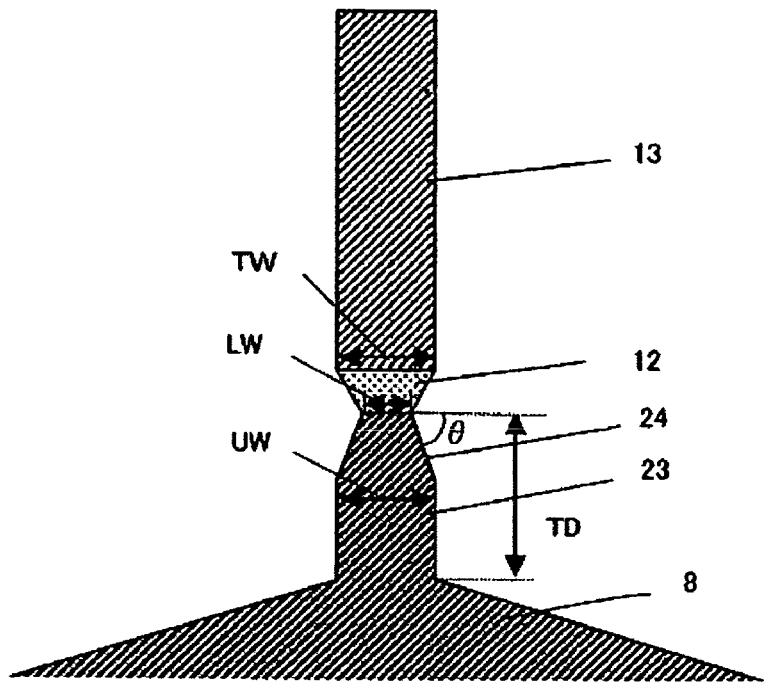
FIG. 1 is a front view showing a shape of a recording head of a thin film magnetic head in Embodiment 1 according to the invention.

The invention aims to solve the above described problems, that is, decrease of the recording magnetic field and increase of the fringe magnetic field, in the head where the width LW of the leading side magnetic pole piece is made smaller than the width TW of the trailing side magnetic pole piece, and the erase band ΔE is reduced. A shape of the thin film magnetic head in Embodiment 1 according to the invention, as seen from the air bearing surface, is shown in FIG. 1. In FIG. 1, there are shown only the lower magnetic pole piece front end layer 8, the upper magnetic pole piece front end layer 13, the write gap 12, and the lower magnetic pole piece protuberance 23. The thin film magnetic head according to this embodiment of the invention is essentially constructed in such a manner that the width LW of the lower magnetic pole piece protuberance 23, which is the leading side magnetic pole piece, at a face in contact with the write gap 12, may be smaller than the width TW of the upper magnetic pole piece front end layer 13, which is the trailing side magnetic pole piece, at a face in contact with the write gap 12, and that the width UW of the lower magnetic pole piece protuberance 23 may become larger than the width LW, in a direction away from the write gap 12.

Figure 11:
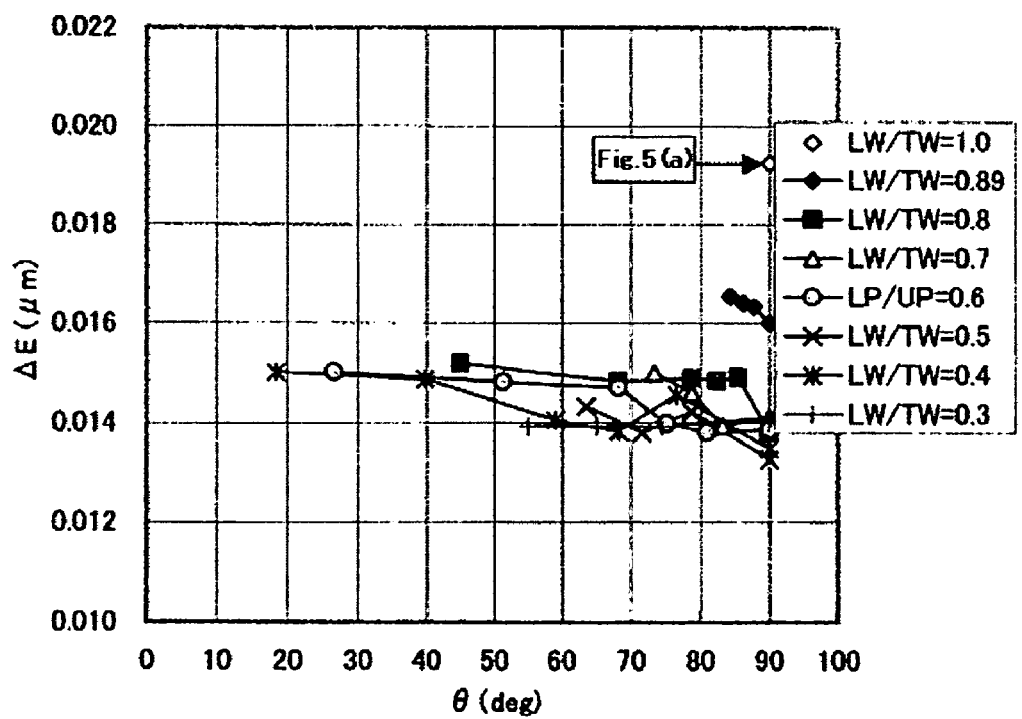
FIG. 11 is a graph showing the erase band ΔE in Embodiment 1.
Figure 12:
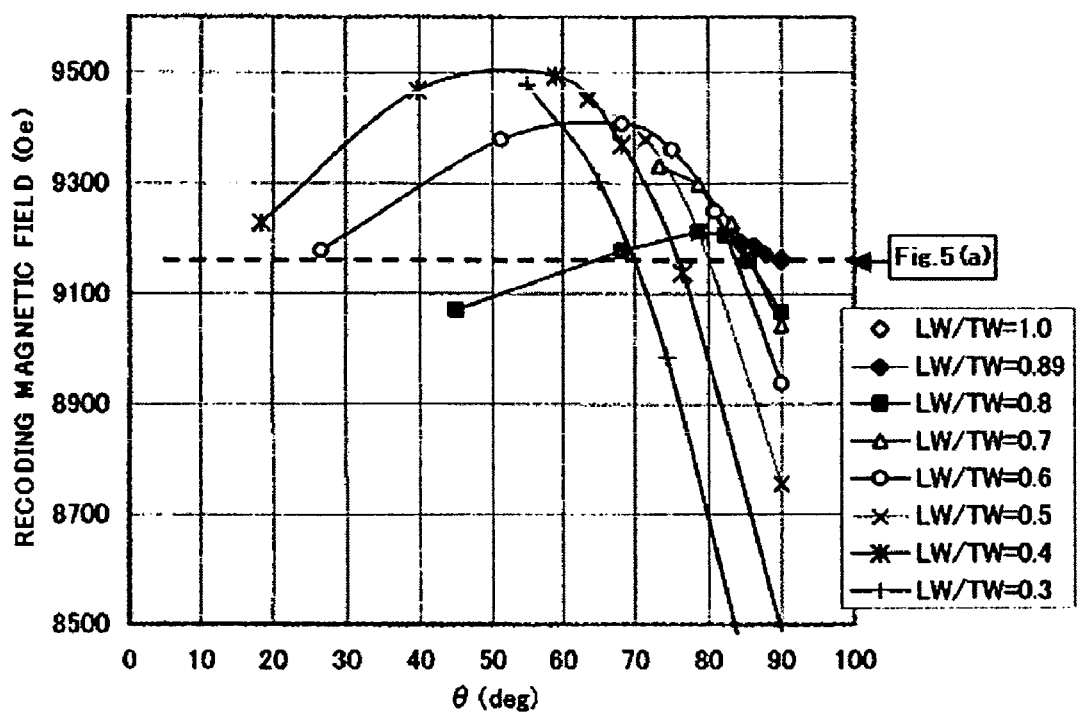
FIG. 12 is a graph showing the magnetic field intensity at the track center in Embodiment 1.
Figure 13:
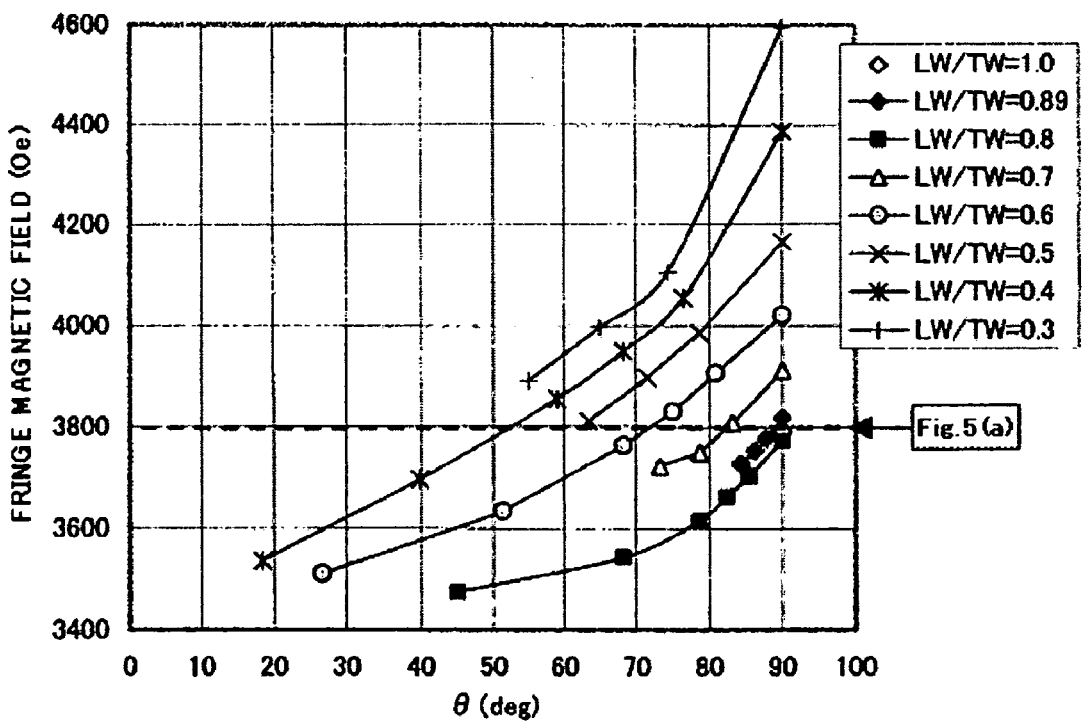
FIG. 13 is a graph showing the fringe magnetic field in Embodiment 1.

In the thin film magnetic head having the shape as shown in FIG. 1, the ratio LW/TW between the width of the leading side magnetic pole piece and the width of the trailing side magnetic pole piece at the faces in contact with the write gap 12, and an angle θ of a side face 24 of the lower magnetic pole piece protuberance 23 just below the write gap with respect to a face of the write gap were varied. Changes of the erase band ΔE, the recording magnetic field at the track center, and the fringe magnetic field at the adjacent track, when the ratio LW/TW and the angle θ were varied, are respectively shown in FIGS. 11, 12, and 13. It is to be noted that the largest width UW of the lower magnetic pole piece protuberance 23 is set to be equal to the width TW. As shown in FIG. 11, even though the angle θ was reduced from the prior 90 degrees, the erase band ΔE is kept smaller than in the case of LW=TW, though the erase band ΔE is slightly increased as compared with the case of the angle θ=90°. In this manner, the effect of reducing the erase band ΔE is maintained. On the other hand, as shown in FIG. 12, when the angle θ is made smaller than 90 degrees and the width of the lower magnetic pole piece protuberance 23 is made larger than LW, the recording magnetic field at the track center is remarkably increased under any condition of LW/TW, as compared with the case of 90 degrees as in the prior art. Further, as shown in FIG. 13, when the angle θ is made smaller than 90 degrees, the fringe magnetic field at the position of the adjacent track can be also remarkably decreased under any condition of LW/TW, as compared with the case of 90 degrees as in the prior art.

As described above, in the thin film magnetic head in Embodiment 1, the width LW of the lower magnetic pole piece protuberance 23, which is the leading side magnetic pole piece, at the face in contact with the write gap 12 is made smaller than the width TW of the upper magnetic pole piece front end layer 13, which is the trailing side magnetic pole piece, at the face in contact with the write gap 12. Further, the width of the lower magnetic pole piece protuberance 23 at a position apart from the write gap 12 is made larger than the width LW. Thus it is possible to realize the thin film magnetic head having excellent recording performance in which the erase band ΔE is low, the recording magnetic field is high, and the fringe magnetic field is low. Such effects can be sufficiently recognized in the region where the angle θ is from about 11.5 to 88 degrees, that is, smaller than 90 degrees. Moreover, in the region where the ratio LW/TW is from about 0.4 to 0.9, such effects that the erase band ΔE and the fringe magnetic field are decreased, and the recording magnetic field is increased, can be sufficiently recognized.

Embodiment 2

Figure 2:
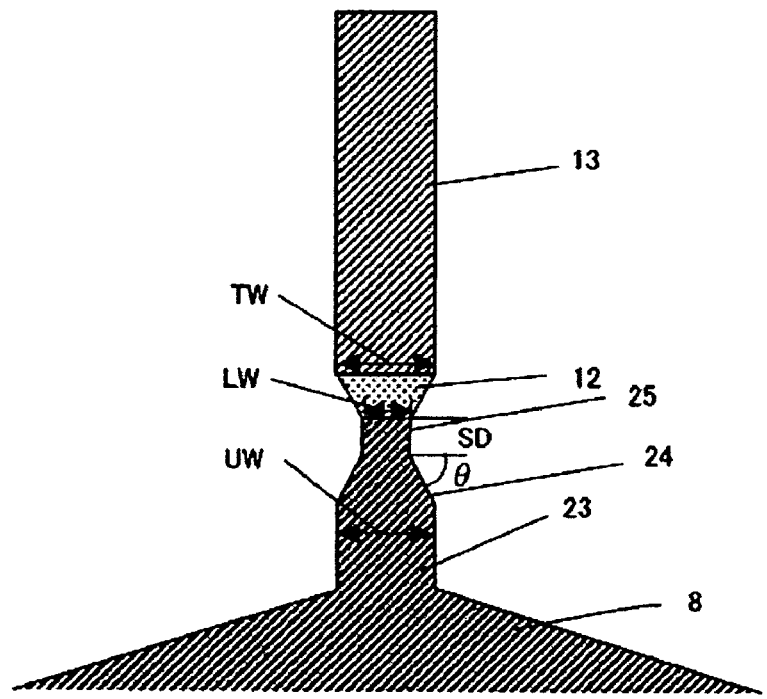
FIG. 2 is a front view showing a shape of a recording head of a thin film magnetic head in Embodiment 2 according to the invention.
Figure 14:
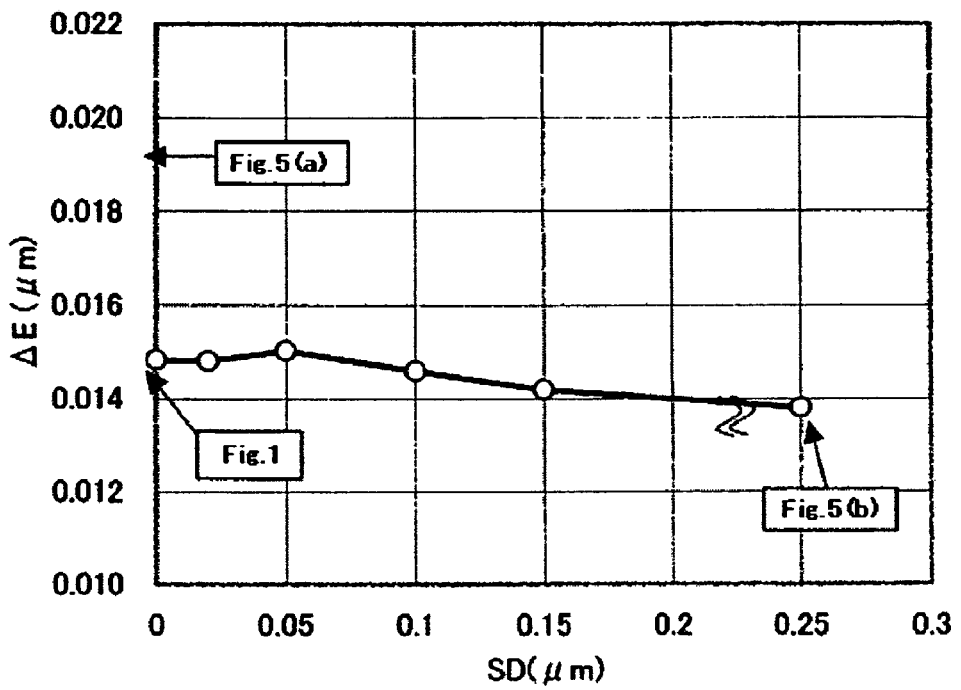
FIG. 14 is a graph showing the erase band ΔE in Embodiment 2.
Figure 15:
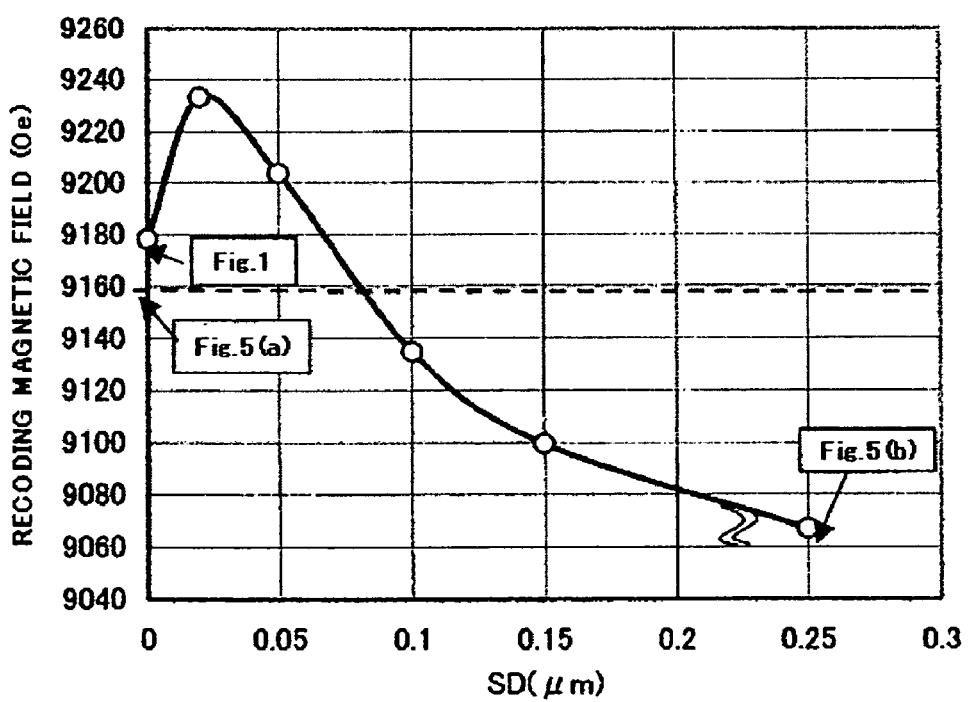
FIG. 15 is a graph showing the magnetic field intensity at the track center in Embodiment 2.
Figure 16:
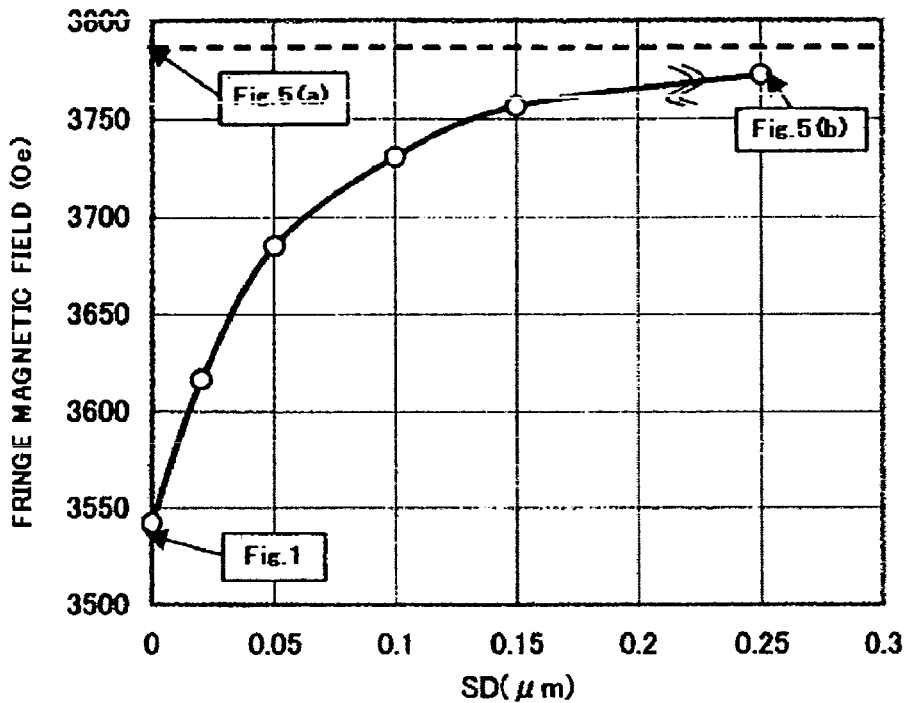
FIG. 16 is a graph showing the fringe magnetic field in Embodiment 2.

A structure of Embodiment 2 is shown in FIG. 2. In this embodiment, an intermediate portion 25 of the lower magnetic pole piece protuberance having a width equal to that of LW and a height SD is formed between the lower magnetic pole piece protuberance 23 and the write gap 12, which are shown in the thin film magnetic head in Embodiment 1 of FIG. 1. The width of the lower magnetic pole piece protuberance 23 in an area adjacent to the intermediate portion 25 is increased from LW up to UW, in the same manner as in FIG. 1. In the thin film magnetic head in this embodiment, changes of the erase band ΔE, the recording magnetic field at the track center, and the fringe magnetic field at the adjacent track, depending on the height SD of the intermediate portion 25 of the lower magnetic pole piece protuberance, are respectively shown in FIGS. 14, 15, and 16. It is to be noted that the ratio LW/TW is set to be 0.8, the angle θ of the side face 24 of the lower magnetic pole piece protuberance 23 with respect to the face of the write gap is set to be 68 degrees, and the largest width UW of the lower magnetic pole piece protuberance 23 is set to be equal to TW. In this embodiment, in the case where the intermediate portion 25 of the lower magnetic pole piece protuberance having the width LW is provided, the effect of reducing the erase band ΔE is fully maintained, as shown in FIG. 14, as compared with the case of LW=TW in FIG. 5(a). Moreover, the effect of increasing the recording magnetic field is maintained as shown in FIG. 15, as compared with the prior art in FIG. 5(b). Further, the effect of decreasing the fringe magnetic field is maintained, as shown in FIG. 16, as compared with the prior art in FIG. 5(b).

Figure 17:
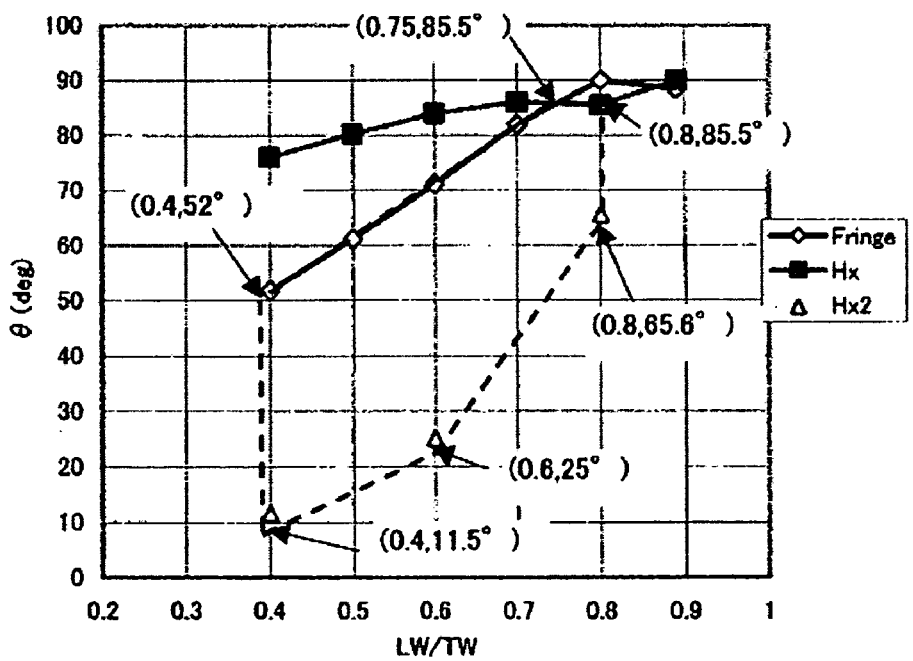
FIG. 17 is a graph showing a preferable range of the thin film magnetic head according to the invention.

The most remarkable effect among the effects of the invention can be obtained in the range where the recording magnetic field is higher and the fringe magnetic field is lower than in the conventional thin film magnetic head in which LW=TW, as shown in FIG. 5(a). Conditions of the ratio LW/TW and the angle θ to make the recoding magnetic field higher and the fringe magnetic field lower than in the thin film magnetic head of LW=TW were obtained from FIGS. 12 and 13, and shown in FIG. 17. In a range where the angle θ is smaller than an the angle for a curve named "Fringe" in FIG. 17, the fringe magnetic field becomes lower than in the head of LW=TW. moreover, in an angular range between a curve named Hx and curve named Hx2, the recording magnetic field becomes higher than in the head of LW=TW. Moreover, in a range where the ratio LW/TW is 0.8 or less, high effect of reducing the erase band ΔE can be obtained, as shown in FIG. 11. Although the same effect can be obtained even in a range where the ratio LW/TW is less than 0.4, it is difficult to manufacture such a magnetic head. From the foregoing, excellent effects of the invention can be obtained in the range indicated by a polygonal shape in which the LW/TW and the angle θ are respectively (0.8, 85.5°), (0.75, 85.5°), (0.4, 52°), (0.4, 11.5°), (0.6, 25°), (0.8, 65.6°). Further, the thin film magnetic head having the shape of Embodiment 2 as shown in FIG. 2, in which the height SD of the intermediate portion 25 of the lower magnetic pole piece protuberance is from about 0.01 μm to 0.08 μm, exhibits the excellent effects as shown in FIGS. 15 and 16.

Figure 18:
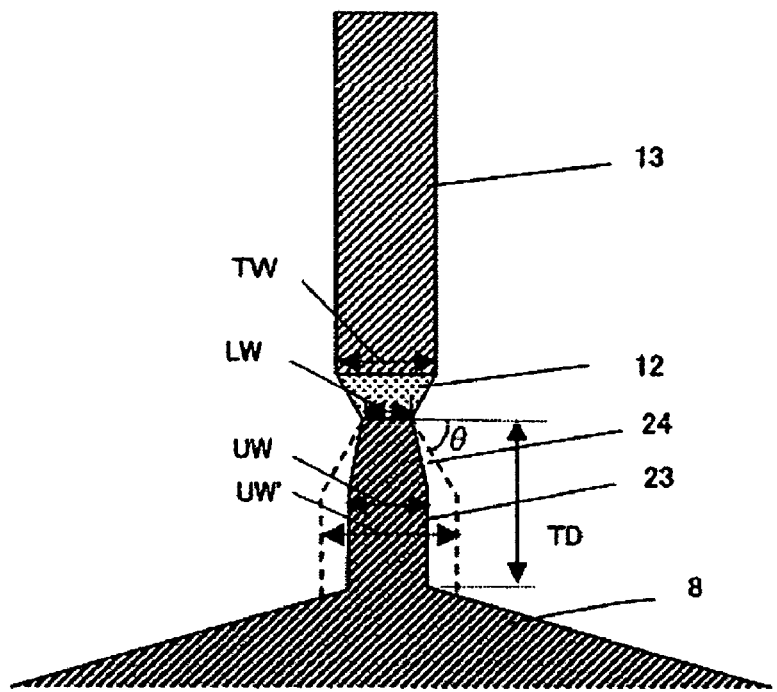
FIG. 18 is a view showing a modification of Embodiment 1.
Figure 19:
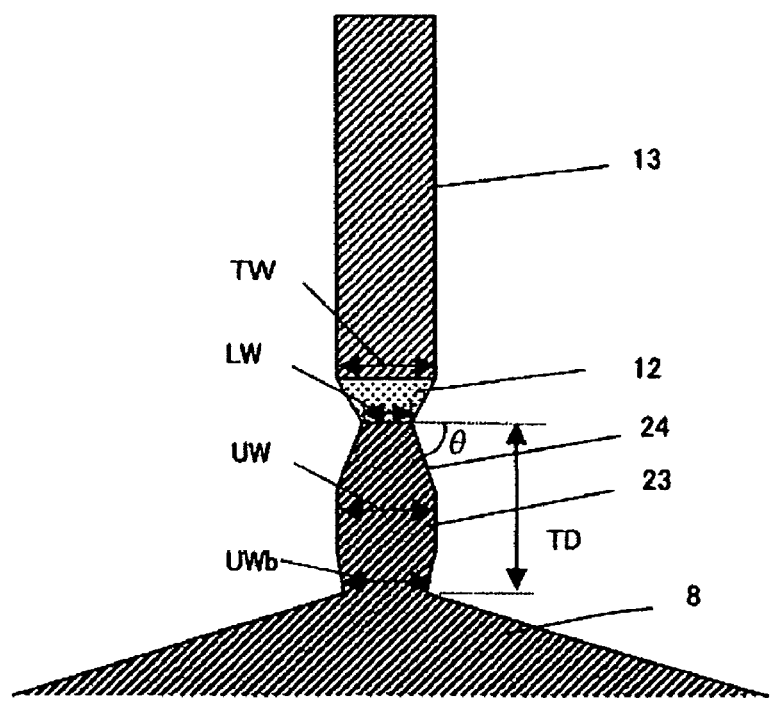
FIG. 19 is a view showing another modification of Embodiment 1.

In the embodiments of the invention as shown in FIGS. 1 and 2, the case where the largest width UW of the lower magnetic pole piece protuberance 23 is equal to the width TW of the trailing side magnetic pole piece has been described. However, the invention is not limited to the case where TW=UW, but, the effects can be also obtained in the case where UW is smaller than TW as shown in FIG. 18, and in the case where UW' is larger than TW as shown by a dotted line in FIG. 18. In these cases, it is necessary to make UW at least larger than LW. In the case where UW is extraordinarily large as compared with TW, the equi-magnetic field curve is swelled at the leading side, and the effect of reducing the erase band ΔE is deteriorated. Therefore, the ratio UW/TW must be about 2 or less. Moreover, in the case where a width UWb of a base part of the lower magnetic pole piece protuberance 23 is smaller than the largest width UW of the lower magnetic pole piece protuberance, as shown in FIG. 19, the effects of the invention can be maintained in a range where UWb is larger than LW.

As an essential structure of the thin film magnetic head to which the shape according to the invention is applied, the structure in which the lower magnetic pole piece front end layer 8 and the upper magnetic pole piece front end layer 13 are present, as shown in FIGS. 3 and 4, has been described. However, the shape of the thin film magnetic head according to the invention is not only applied to the above described structure, but can be also applied to the thin film magnetic head in which the lower magnetic pole piece front end layer 8 is omitted, and the lower magnetic pole piece is essentially composed of the lower magnetic pole piece end layer 7 only, or the thin film magnetic head in which the upper magnetic pole piece front end layer 13 is omitted, and the upper magnetic pole piece is essentially composed of the upper magnetic pole piece upper layer 18 only. Further, the shape according to the invention can be also applied to the thin film magnetic head having such a structure that the lower magnetic pole piece front end portion and the upper magnetic pole piece front end portion which have the same width in a direction of the track width are sandwiched between the lower magnetic pole piece and the upper magnetic pole piece.

Figure 20:
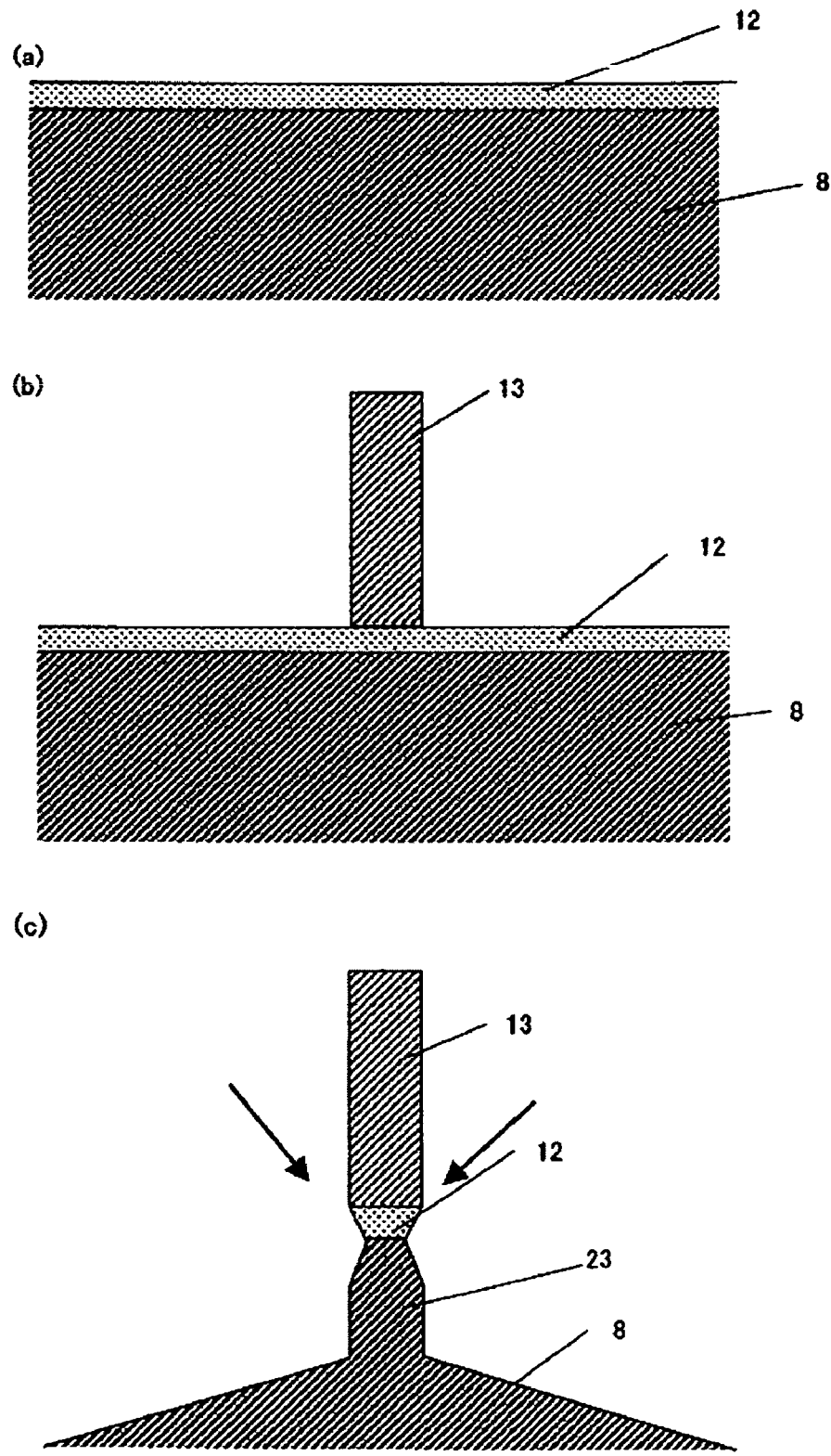
FIG. 20 is views showing a process for producing the thin film magnetic head as shown in FIGS. 1 and 2.

A process for producing the thin film magnetic head in the above described Embodiments 1 and 2 is shown in FIG. 20. FIG. 20 shows views of the thin film magnetic head as seen from the air bearing surface, illustrating only a process for producing the shape of the recording head, and other processes are omitted. In FIG. 20(a), the lower magnetic pole piece front end layer 8 having a determined shape is formed on the lower magnetic pole piece main layer (not shown) by plating method or so. Then, the write gap layer 12 is formed on the layer 8 by sputtering or the like. In this case, material having a higher milling rate than the material employed for the upper magnetic pole piece front end layer 13 and the lower magnetic pole piece protuberance 23 should be selected as the material for the write gap layer 12. Specifically, nonmagnetic metal having a high melting point such as Pt, Rh, Ru, Pd is employed. In FIG. 20(b), a resist frame for forming the upper magnetic pole piece front end layer 13 is provided on the write gap layer 12, and the material for the upper magnetic pole piece front end layer 13 is formed within the resist frame by plating method or the like. Thereafter, the resist frame is removed. Then, the write gap layer 12 is removed by ion milling, with the upper magnetic pole piece front end layer 13 used as a mask, and further, the lower magnetic pole piece front end layer 8 is engraved. In this manner, the lower magnetic pole piece protuberance 23 is formed, as shown in FIG. 20(c).

The above described process of ion milling involves controlling an angle of ion radiation as shown by an arrow mark in FIG. 20(c). In this process, the material for the write gap layer 12 has a higher milling rate than the material for the upper magnetic pole piece front end layer 13 and the lower magnetic pole piece protuberance 23. Therefore, it is possible to produce the thin film magnetic head having the shape of the invention in which the width LW of the lower magnetic pole piece protuberance 23 at the face in contact with the write gap layer 12 is made smaller than the width TW of the upper magnetic pole piece front end layer 13 at the face in contact with the write gap layer 12, and the width of the lower magnetic pole piece protuberance 23 at the position apart from the write gap layer 12 is made larger than the width LW, as shown in FIG. 1, Moreover, by varying the angle of the ion radiation during the ion milling process, it is possible to produce the shape in Embodiment 2 as shown in FIG. 2.

The thin film magnetic head according to the invention can attain excellent effects in the thin film magnetic head having a narrow track wherein the width of the leading side magnetic pole piece at the face in contact with the write gap is essentially about 0.2 µm or less. Moreover, it is possible to realize the magnetic disk drive capable of performing high density recording which has a narrow track pitch of about 0.22 µm or less, by installing the thin film magnetic head according to the invention.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A thin film magnetic head comprising:
   a reader including a magnetic shield layer and a read element formed above a substrate; and
   a writer including a leading side magnetic pole piece and a trailing side magnetic pole piece being opposed to each other through a write gap;
   wherein a width in a track width direction of said leading side magnetic pole piece at a face in contact with said write gap is smaller than a width in the track width direction of said trailing side magnetic pole piece at a face in contact with said write gap, and a width in the track width direction of said leading side magnetic pole piece in a part contiguous to said write gap is made continuously larger, in a direction away from said write gap, and
   wherein the largest width of said leading side magnetic pole piece is at most about twice the width of said trailing side magnetic pole piece at the face in contact with said write gap.

2. The thin film magnetic head as claimed in claim 1, wherein said leading side magnetic pole piece includes a lower magnetic pole piece layer and a lower magnetic pole piece protuberance protruded from said lower magnetic pole piece layer, and said lower magnetic pole piece protuberance is opposed to said trailing side magnetic pole piece through said write gap.

3. The thin film magnetic head as claimed in claim 1, wherein said leading side magnetic pole piece includes a lower magnetic pole piece main layer, a lower magnetic pole piece front end layer provided on said lower magnetic pole piece main layer, and a lower magnetic pole piece protuberance protruded from said lower magnetic pole piece front end layer, and said lower magnetic pole piece protuberance is opposed to said trailing side magnetic pole piece through said write gap.

4. The thin film magnetic head as claimed in claim 1, wherein said leading side magnetic pole piece includes a lower magnetic pole piece main layer and a lower magnetic pole piece front end layer provided on said lower magnetic pole piece main layer, said lower magnetic pole piece front end layer having a lower magnetic pole piece protuberance and a stepped part in rear of said lower magnetic pole piece protuberance, and said lower magnetic pole piece protuberance is opposed to said trailing side magnetic pole piece through said write gap.

5. The thin film magnetic head as claimed in claim 1, wherein a ratio between the width of said leading side magnetic pole piece and the width of said trailing side magnetic pole piece at the faces in contact with said write gap is from about 0.4 to 0.9.

6. The thin film magnetic head as claimed in claim 1, wherein the width of said leading side magnetic pole piece is such that an angle of a side face of said leading side magnetic pole piece against said write gap is from about 11.5 degrees to 88 degrees.

7. The thin film magnetic head as claimed in claim 1, wherein said thin film magnetic head is in a range indicated by a polygonal shape in which a ratio between the width of said leading side magnetic pole piece and the width of said trailing side magnetic pole piece at the faces in contact with said write gap, and an angle of a side face of said leading side magnetic pole piece against said write gap are in the following relations, (0.8, 85.5°, (0.75, 85.5°), (0.4, 52°, (0.4, 11.5°), (0.6, 25°), (0.8, 65.6°).

8. The thin film magnetic head as claimed in claim 1, wherein the width of said trailing side magnetic pole piece at the face in contact with said write gap does not exceed about 0.2 µm.

9. A thin film magnetic head comprising:
   a reader including a magnetic shield layer and a read element formed above a substrate; and a writer including a leading side magnetic pole piece and a trailing side magnetic pole piece being opposed to each other through a write gap;

wherein said leading side magnetic pole piece includes a part in contact with said write gap and having a smaller width than the width of said trailing side magnetic pole piece at the face in contact with said write gap, another part contiguous from said part having the smaller width and having a substantially constant width in a direction away from said write gap, and still another part contiguous from said part having the substantially constant width and having a width which is made larger, in a direction away from said write gap, and wherein the largest width of said leading side magnetic pole piece is at most about twice the width of said trailing side magnetic pole piece at the face in contact with said write gap.

10. The thin film magnetic head as claimed in claim 9, wherein a length of said part having the substantially constant width from said part having the smaller width is from about 0.01 μm to 0.08 μm.

11. The thin film magnetic head as claimed in claim 9, wherein the width of said trailing side magnetic pole piece at the face in contact with said write gap does not exceed about 0.2 μm.

12. A magnetic disk drive comprising:

a thin film magnetic head including a reader including a magnetic shield layer and a read element formed above a substrate, and a writer including a leading side magnetic pole piece and a trailing side magnetic pole piece being opposed to each other through a write gap, wherein a width in a track width direction of said leading side magnetic pole piece at a face in contact with said write gap is smaller than a width in the track width direction of said trailing side magnetic pole piece at a face in contact with said write gap, and a width in the track width direction of said leading side magnetic pole piece in a part contiguous to said write gap is made continuously larger, in a direction away from said write gap, and a magnetic disk having a track pitch of about 0.22 μm or less, wherein the largest width of said leading side magnetic pole piece is at most about twice the width of said trailing side magnetic pole piece at the face in contact with said write gap.

13. The magnetic disk drive as claimed in claim 12, wherein said leading side magnetic pole piece includes a lower magnetic pole piece layer and a lower magnetic pole piece protuberance protruded from said lower magnetic pole piece layer, and said lower magnetic pole piece protuberance is opposed to said trailing side magnetic pole piece through said write gap.

14. The magnetic disk drive as claimed in claim 12, wherein said leading side magnetic pole piece includes a lower magnetic pole piece main layer, a lower magnetic pole piece front end layer provided on said lower magnetic pole piece main layer, and a lower magnetic pole piece protuberance protruded from said lower magnetic pole piece front end layer, and said lower magnetic pole piece protuberance is opposed to said trailing side magnetic pole piece through said write gap.

15. The magnetic disk drive as claimed in claim 12, wherein said leading side magnetic pole piece includes a lower magnetic pole piece main layer and a lower magnetic pole piece front end layer provided on said lower magnetic pole piece main layer, said lower magnetic pole piece front end layer having a lower magnetic pole piece protuberance and a stepped part in rear of said lower magnetic pole piece protuberance, and said lower magnetic pole piece protuberance is opposed to said trailing side magnetic pole piece through said write gap.

16. The magnetic disk drive as claimed in claim 12, wherein a ratio between the width of said leading side magnetic pole piece and the width of said trailing side magnetic pole piece at the faces in contact with said write gap is from about 0.4 to 0.9.

17. The magnetic disk drive as claimed in claim 12, wherein the width of said leading side magnetic pole piece is such that an angle of a side face of said leading side magnetic pole piece against said write gap is from about 11.5 degrees to 88 degrees.

18. The magnetic disk drive as claimed in claim 12, wherein said thin film magnetic head is in a range indicated by a polygonal shape in which a ratio between the width of said leading side magnetic pole piece and the width of said trailing side magnetic pole piece at the faces in contact with said write gap, and an angle of a side face of said leading side magnetic pole piece against said write gap are in the following relations, (0.8, 85.5°), (0.75, 85.5°), (0.4, 52°), (0.4, 11.5°), (0.6, 25°), (0.8, 65.6°).

* * * * *